United States Patent [19]

Nashiki

[11] Patent Number: 5,359,872
[45] Date of Patent: Nov. 1, 1994

[54] METHOD AND APPARATUS FOR SHEET-METAL PROCESSING

[75] Inventor: Masayuki Nashiki, Niwa, Japan

[73] Assignee: Okuma Corporation, Aichi, Japan

[21] Appl. No.: 936,834

[22] Filed: Aug. 28, 1992

[30] Foreign Application Priority Data

Aug. 29, 1991 [JP] Japan .................................. 3-244601
Dec. 26, 1991 [JP] Japan .................................. 3-357729

[51] Int. Cl.$^5$ .......................... B21D 5/04; B23K 26/08
[52] U.S. Cl. .................................... 72/9; 72/10;
72/305; 72/306; 72/311; 72/342.94; 72/379.2;
219/121.62; 219/121.8
[58] Field of Search ..................... 72/13, 342.1, 342.94,
72/308, 311, 319, 305, 306, 8–10, 379.2;
219/121.6, 121.67, 121.73, 121.75, 121.78,
121.79, 121.8, 121.81, 121.62

[56] References Cited

U.S. PATENT DOCUMENTS

| | | | |
|---|---|---|---|
| 3,790,744 | 2/1974 | Bowen | 83/879 |
| 4,317,981 | 3/1982 | Chubarov et al. | 219/121.81 |
| 4,594,868 | 6/1986 | Takeuchi et al. | 72/319 |
| 4,797,532 | 1/1989 | Maiorov | 219/121.8 |
| 4,806,726 | 2/1989 | Rosa et al. | 219/121.78 |
| 4,991,422 | 2/1991 | Sartorio | 72/311 |
| 5,109,148 | 4/1992 | Fujita et al. | 219/121.78 |
| 5,185,511 | 2/1993 | Yabu | 219/121.78 |

*Primary Examiner*—Lowell A. Larson
*Assistant Examiner*—Thomas C. Schoeffler
*Attorney, Agent, or Firm*—Wenderoth, Lind & Ponack

[57] ABSTRACT

The portion to be deformed of a metal sheet is heated by irradiating it with a laser beam which is scanned at a high speed, and, when the portion to be deformed has attained a predetermined temperature, a bending force is applied to the portion to be bent to perform bending of the metal sheet. When the shape of a metal sheet is to be worked into a circular arc of 90° having a predetermined radius by means of six bending processes, the metal sheet is worked such that the working process is divided into six processes and the bending processes are sequentially performed after fixing a metal sheet edge of the metal sheet. The yield strength of a steel material is reduced when it is heated and a metal sheet is worked using a laser by which a local heating is possible. Dies are therfore unnecessary, whereby processing at low costs and an apparatus therefor may be achieved.

7 Claims, 21 Drawing Sheets

METHOD AND APPARATUS FOR SHEET-METAL PROCESSING

BACKGROUND OF THE INVENTION

1. Field of the Invention

The present invention relates to a sheet-metal processing method for performing, for example, cutting, bending, drawing, welding and modifying of a sheet metal and to an apparatus therefor.

2. Description of the Prior Art

In conventional sheet-metal processing, cutting of a simple contour is performed by a sheet metal cutter which cuts a straight line, while a complicated contour is cut by a turret punch press, or by making special dies for that purpose or by grinding using a machine. Bending of a metal sheet is performed by a sheet metal bender using various standard dies or making special dies. Drawing of the metal sheet is performed by means of a press with a drawing machine which uses special dies. Welding of the sheet metal is performed by a sheet metal welder operated by a human or by a robot. Modification of the sheet metal material such as heat treatment is rarely performed except for special uses.

Since the special dies are used in conventional cutting, bending and drawing of a complicated shape on a metal sheet, there is a problem in that the degree of freedom in the worked shape is low. Further, aggregating of some or the whole of a series of working steps of the sheet metal into a single apparatus is almost equivalent to simply connecting a plurality of apparatus, where, though process time reduction or automatization may be realized to some extent, the advantage resulting from reductions, for example, costs and the required space of the system as a whole is limited. In other words, there is a problem in that it is difficult to achieve a sheet-metal processing apparatus capable of various types of sheet-metal processing, with relatively lower costs and smaller size.

SUMMARY OF THE INVENTION

The present invention has been made in view of the facts as described above, and it is an object of the present invention to provide a sheet-metal processing method in which a laser is used to increase the degree of freedom in length and angle of bending or in the shape of drawing without using a special die and to provide a sheet-metal processing apparatus therefor capable of various kinds of sheet-metal processing with relatively lower costs and smaller size.

According to one aspect of the present invention, for achieving the objects described above, there is provided a method of sheet-metal processing comprising the steps of: irradiating a portion to be deformed of a metal sheet with a laser beam being scanned at a high speed to heat said portion to be deformed; and applying a force to said portion to be deformed so as to process said metal sheet.

According to another aspect of the present invention, there is provided a laser working apparatus comprising: a laser oscillator; a laser beam conducting means for conducting a laser beam which is the output of the laser oscillator and converging it such as by lens as required; a scanning means for scanning the laser beam at a high speed in a straight line or in an optional contour; deforming means for applying a force to a metal sheet to deform the metal sheet which is the work piece being irradiated with laser beam scanned at high speed; and a control means for controlling each of the foregoing means in accordance with various conditions of working which have been set for the metal sheet.

Further, according to still another aspect of the present invention, there is provided a method of sheet-metal processing wherein: a laser beam scanned at a high speed is irradiated onto an optional straight line on a metal sheet plane to heat the portion along said straight line, and a bending force is applied to said straight line to perform the bending of said metal sheet when the portion along said straight line has attained a predetermined temperature; and the bending is performed sequentially on straight lines substantially parallel to each other at predetermined intervals within the portions to be deformed of said metal sheet; whereby said metal sheet is bent into a curved surface having a cross section that is substantially continuous and smooth.

Still further, according to another aspect of the present invention, there is provided a method of sheet-metal processing for heat-treating a metal sheet using a laser beam, wherein the heat-treatment is performed by using: a process in which a laser beam having a predetermined laser beam diameter is irradiated at such speed that the irradiated portion of said metal sheet attains a predetermined temperature, sequentially heating the portions of said metal sheet to be subjected to the heat-treatment; a process in which the portion of said metal sheet to be subjected to the heat-treatment is heated by irradiating a scanning laser beam until the temperature of the irradiated portion of said metal sheet is raised to a predetermined temperature; or a process in which, in the working process of said metal sheet consisting of a plurality of processes, processes for those portions to be deformed which are separated by a small distance from each other are selected so as not to cause a thermal interference between the processes, or the heat resulting from one process is cooled before performing the next process to the extent not to cause a thermal interference thereat.

The nature, principle and utility of the invention will become more apparent from the following detailed description when read in conjunction with the accompanying drawings.

DESCRIPTION OF THE PREFERRED EMBODIMENTS

First, the principle of a sheet-metal processing by means of a laser is described.

Figure 1:
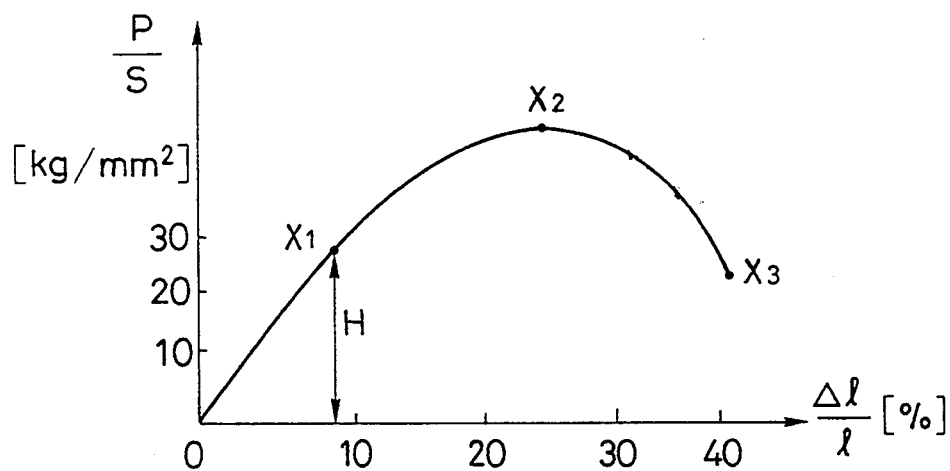
FIG. 1 is a first view for explaining the principle of the sheet-metal processing method of the present invention.
Figure 2:
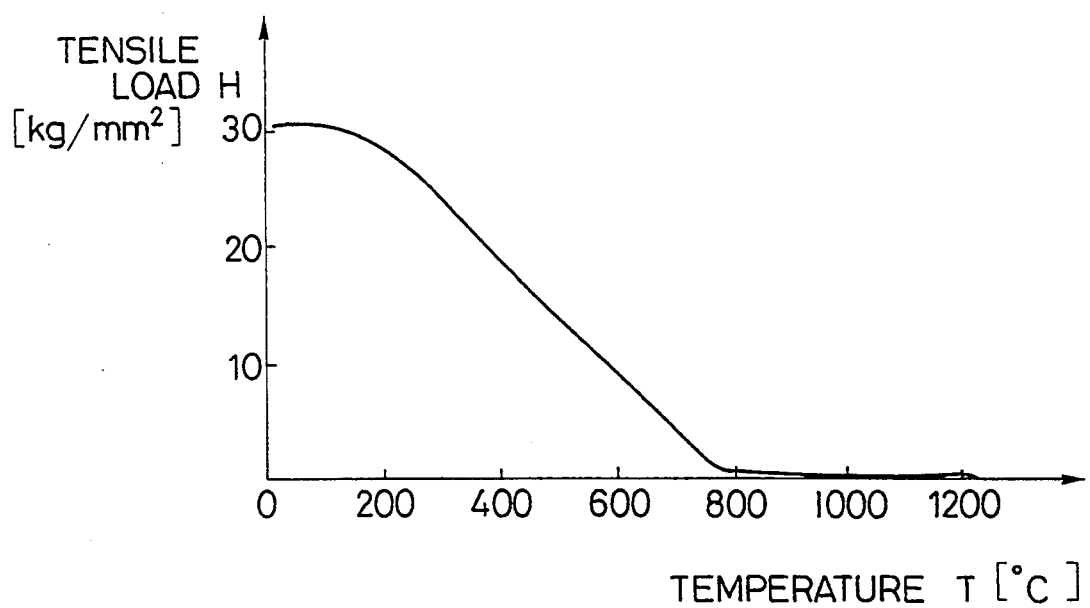
FIG. 2 is a second view for explaining the principle of the sheet-metal processing method of the present invention.
Figure 3:
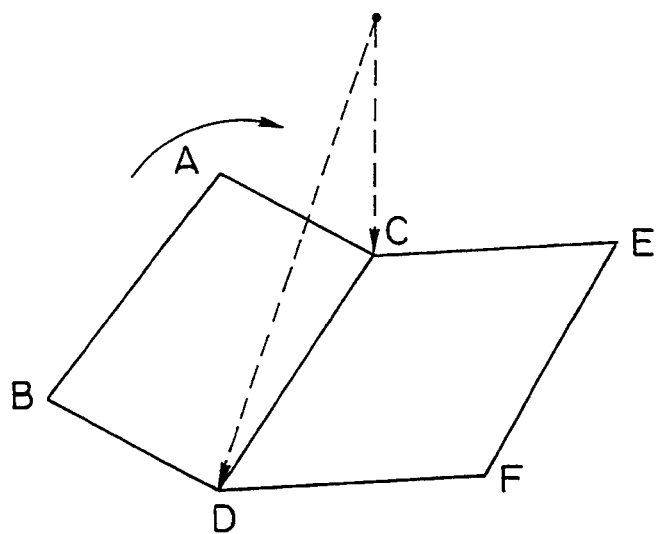
FIG. 3 is a view illustrating a first example of working by the sheet-metal processing apparatus of the present invention.
Figure 4:
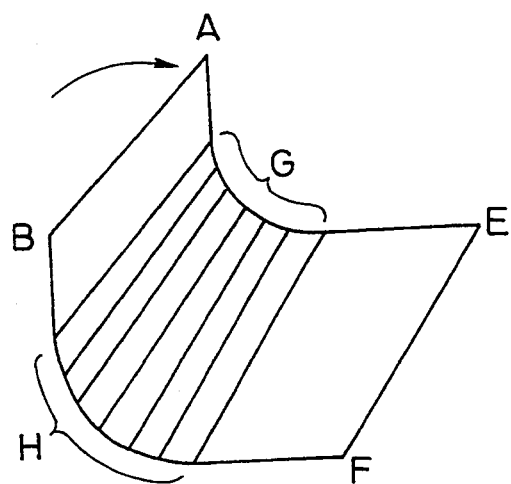
FIG. 4 is a view illustrating a second example of working by the sheet-metal processing apparatus of the present invention.
Figure 5:
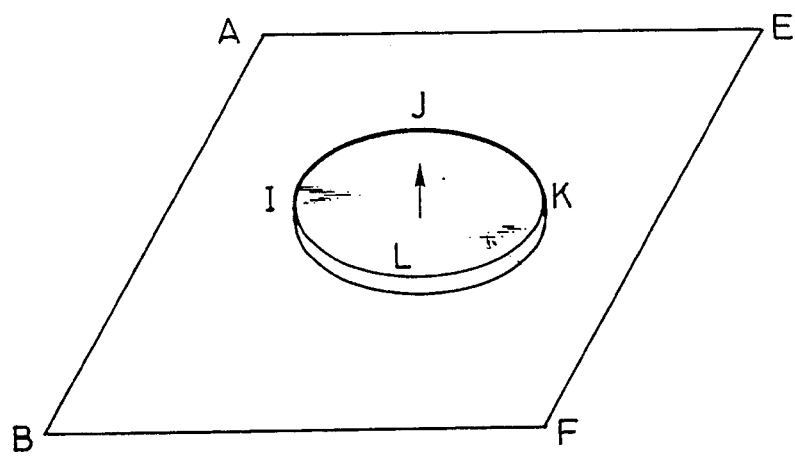
FIG. 5 is a view illustrating a third example of working by the sheet-metal processing apparatus of the present invention.
Figure 6:
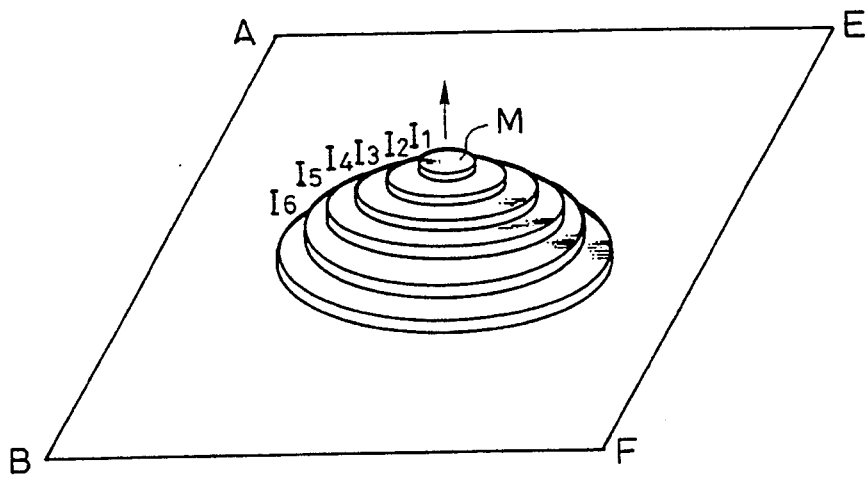
FIG. 6 is a view illustrating a fourth example of working by the sheet-metal processing apparatus of the present invention.
Figure 7:
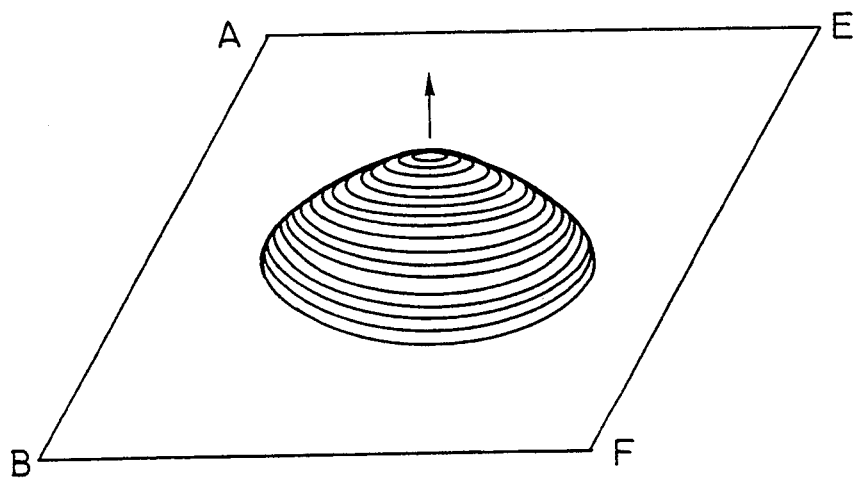
FIG. 7 is a view illustrating a fifth example of working by the sheet-metal processing apparatus of the present invention.

An example of the relation between a tensile strength P/S and a rate of elongation $\Delta l/l$ of a steel material is shown in FIG. 1. The region from the origin o to a point $X_1$ is referred to as the elastic region where the material returns to its original shape upon reducing of the tensile load to zero. The region from the point $X_1$ to points $X_2$ and $X_3$ is the plastic region where the material does not completely return to its original state even if the tensile load is reduced to zero. The point $X_1$ is referred to as the elastic limit and tensile load H thereat has a temperature dependency as shown in FIG. 2. Thus, when a metal sheet ABDFEC as shown in FIG. 3 is to be bent along the line segment CD, the line segment CD is irradiated with a laser being scanned at a high speed to heat the portion along the line segment CD for example up to around 800° C. By applying a force in the direction of the arrow at the end AB while the plane CDEF is fixed, the sheet may easily be bent around the line segment CD, since the elastic limit for the portion of the line segment CD is 1/10 or less of that for the other portions. Further, as shown in FIG. 4, a bending processing of a more smoothly curved surface is also possible such that the portion between end portions G and H on a metal sheet ABFE is irradiated at suitable intervals with a laser beam being scanned at a high speed. Furthermore, by intermittently cutting or by providing a groove along a part or the whole of the portion to be bent, the bending process thereafter may be facilitated. Also, as shown in FIG. 5, the circumference IJKL on the metal sheet ABFE may be irradiated with a laser beam being scanned at a high speed. Then, the portion of the disk IJKL may be drawn into a convex by applying a force in the direction of the arrow to the disk IJKL when a suitable temperature has been obtained at the portion of the circumference IJKL. Moreover, as shown in FIGS. 6 and 7, if the area within the disk IJKL is irradiated at suitable intervals with a laser beam being scanned at a high speed, the drawing is possible also of a stepped or curved surface.

Figure 8:
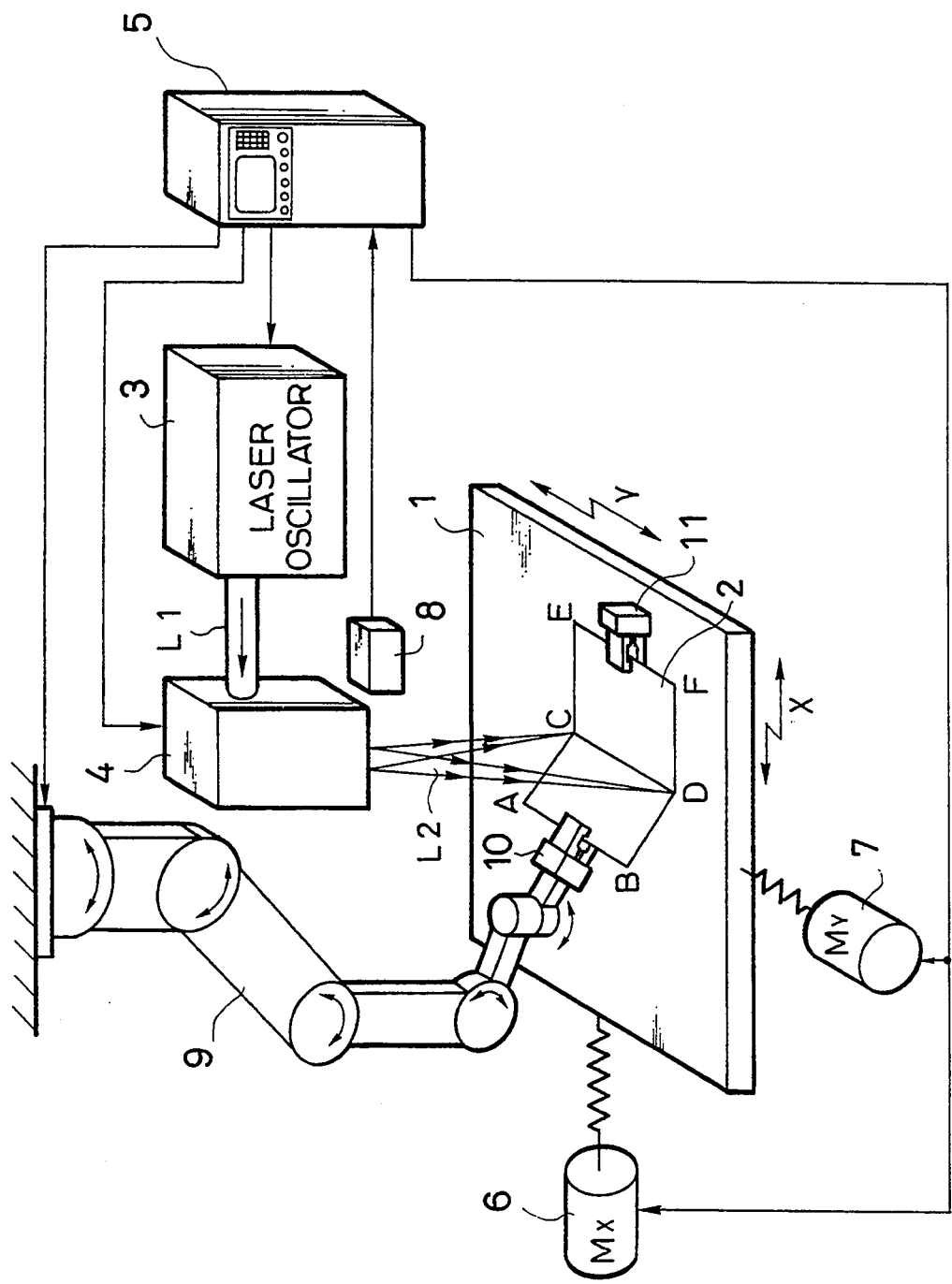
FIG. 8 is a perspective view showing an example of the sheet-metal processing apparatus of the present invention.

FIG. 8 is a perspective view showing an example of a sheet-metal processing apparatus of the present invention, where a laser beam L1 is provided from a laser beam L1 oscillator 3 to be input into a photo-conversion means 4. The laser beam is converged at a suitable point by a laser beam conducting means located within the photo-conversion means 4 and the converged laser beam L2 is scanned by a scanning means located within the photo-conversion means 4 to obtain optional contours such as straight lines, circular arcs or rectangles. In this example, the laser beam L2 from the photo-conversion means 4 is converged to be scanned in a straight line between a point C and a point D of a metal sheet 2 which is a work piece. The metal sheet 2 is placed on a table 1 which may be moved and positioned in X- and Y-axial directions using a servomotor 6 for controlling in the X-axial direction and a servomotor 7 for controlling in the Y-axial direction, and an end of the metal sheet 2 is grasped by a work fixing device 11 which is fixed on the table 1 while the other end thereof is grasped by a work fixing device 10 located at the distal end of an articulated robot 9. Controlling of the laser oscillator 3, the photo-conversion means 4, the table 1 and the articulated robot 9 is performed at the controlling unit 5, and controlling of various types of the sheet-metal processing is performed in accordance with the detected temperature of the portion to be worked obtained from a temperature detector 8.

Figure 9:
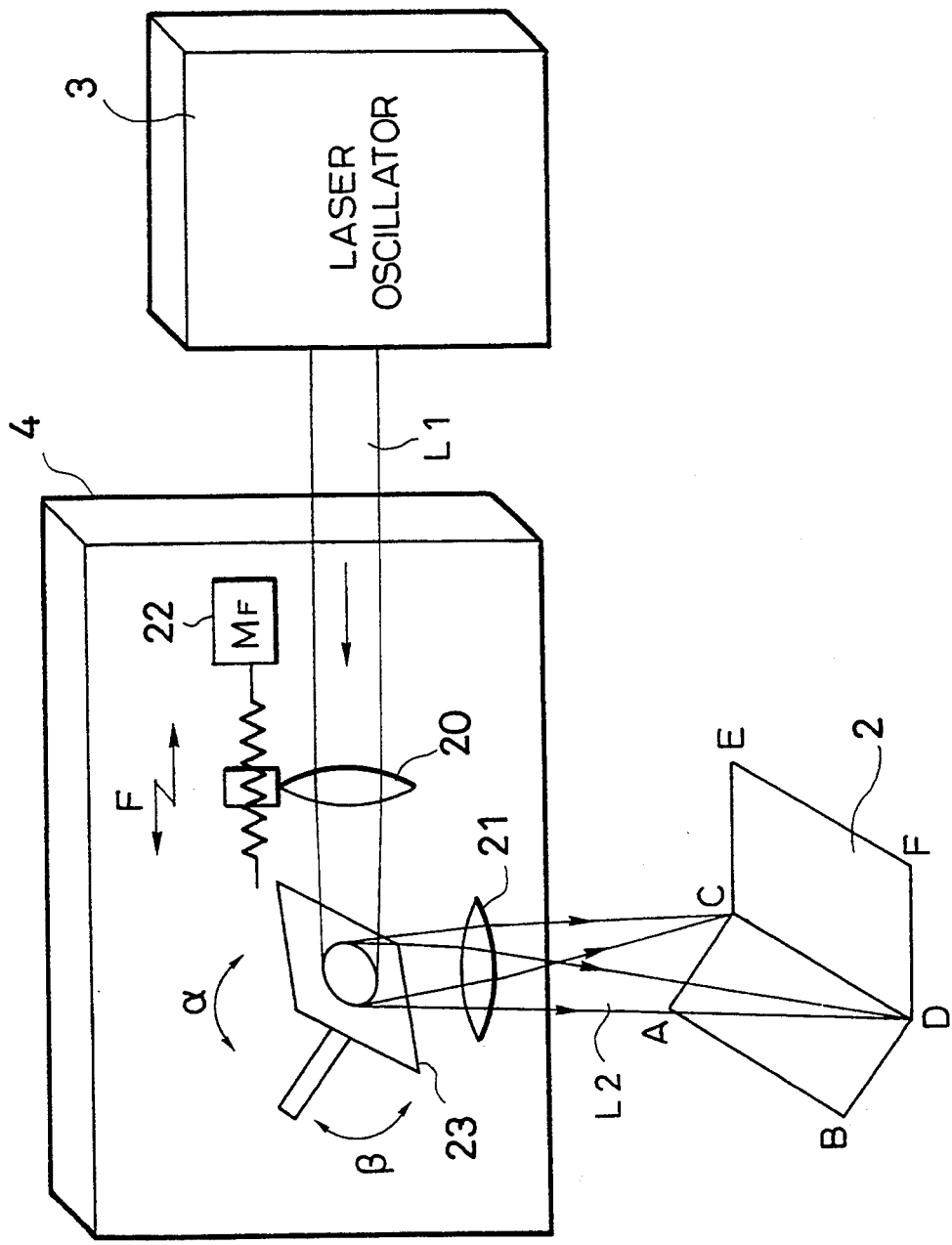
FIG. 9 is a perspective view showing an example of the main portions of the sheet-metal processing apparatus of the present invention.

FIG. 9 is a perspective view showing a detailed example of the photo-conversion means 4 of the sheet-metal processing apparatus as shown in FIG. 8, where the laser beam L1 passes through a scanning unit 23 having a high degree of freedom in two axial directions $\alpha$, $\beta$ via a focusing lens 20 for justing the convergence of light along the processing line segment CD and is applied to the processing line segment CD on the metal sheet 2 via a converging lens 21. The focusing lens 20 is adjusted in its focus as it is controlled in the position along directions F by a focus adjusting servomotor 22. It should be noted that it is also possible to provide means for moving the converging lens 21 in the optical axis as the means for adjusting the state of convergence of the laser beam L2 at the working point, or to provide one serving as both the focusing lens 20 and the converging lens 21.

Figure 10:
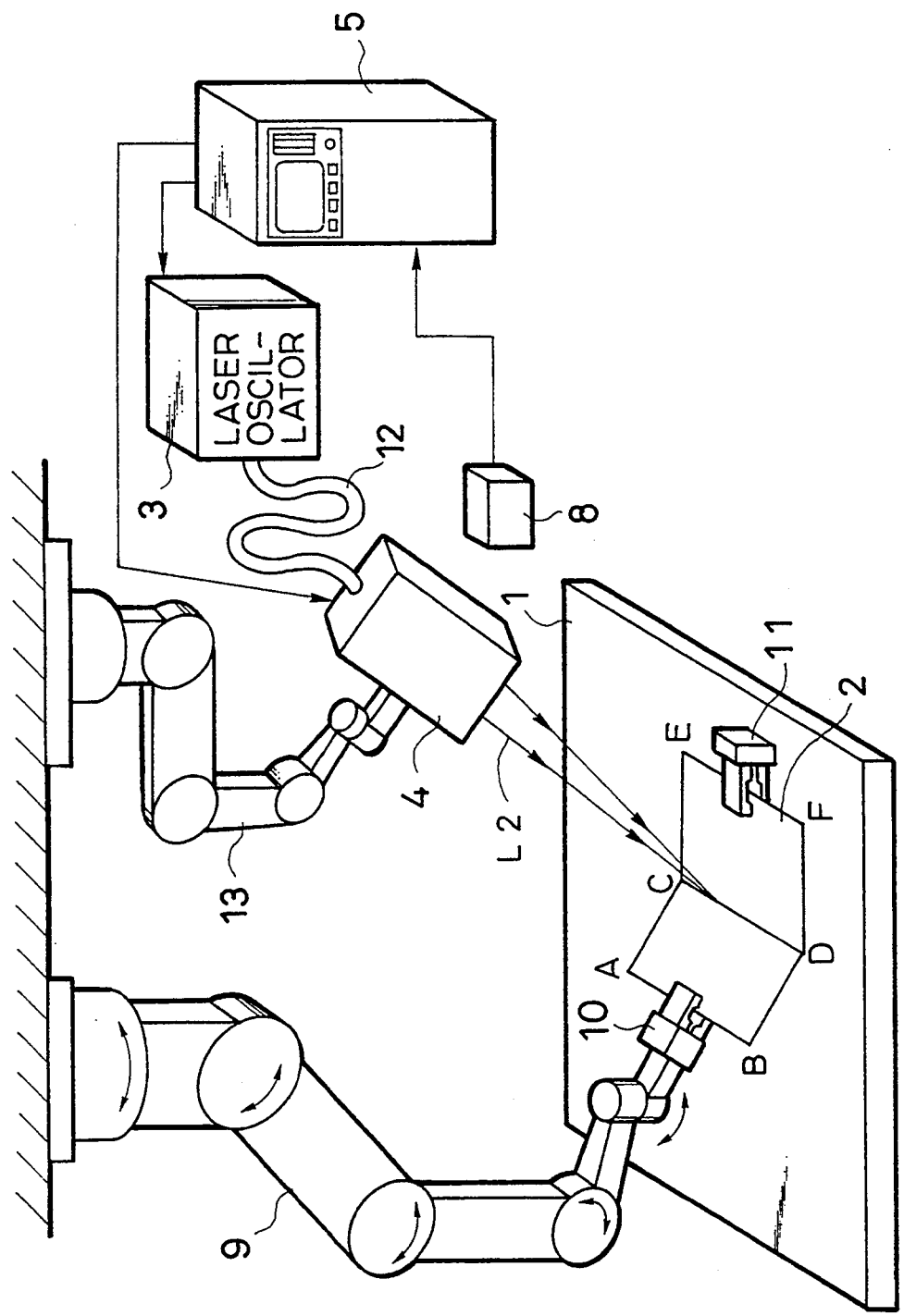
FIG. 10 is a perspective view showing another example of the sheet-metal processing appratus of the present invention.

FIG. 10 is a perspective view showing another example of a sheet-metal processing apparatus of the present invention, where the table 1 is fixed and, instead, the photo-conversion means 4 is freely controlled in its position in the working space by a flexible cord 12 and an articulated robot 13. Thus, the degree of freedom of sheet-metal processing may be greatly increased due to the fact that the direction of the laser beam L2 may be controlled.

It should be noted that, while in the above described embodiments a temperature detector 8 is used to control the sheet-metal processing process, it is also possible that the reaction force of the metal sheet 2 before heating is previously measured and stored and the laser beam L2 is then scanned thereon so that sheet-metal processing is performed while controlling the power of the laser beam L2 such that the reaction force thereof is kept at a constant value where the reaction force of the metal sheet 2 is for example $\frac{1}{3}$ the stored initial reaction force. Further, sheet-metal processing may also be performed such that the estimated reaction forces of the metal sheet 2 at ordinary temperature and at heated temperature are previously obtained through calculation according to its shape and such values are compared with actually measured reaction forces to detect whether it is in the state capable of being bent and whether the power of the laser is suitable. On the other hand, the heat absorption rate of the work piece is important in determining the processing efficiency of the laser working. To prevent the laser beam L2 from being reflected at the surface of the work piece, the work fixing device 10 of the articulated robot 9 for example may be replaced by a spray-type heat absorbing agent applying device to apply a heat absorbing agent to the portion of the work piece to be processed. Further, in some cases, a problem is caused by the relative roughness of the weld surface or by the so-called flash of the cut surface of the metal sheet 2. Thus, the work fixing device 10 of the articulated robot 9 may be replaced with a grinding device to grind the weld surface or the cut surface of the metal sheet 2 for finishing process.

Figure 11:
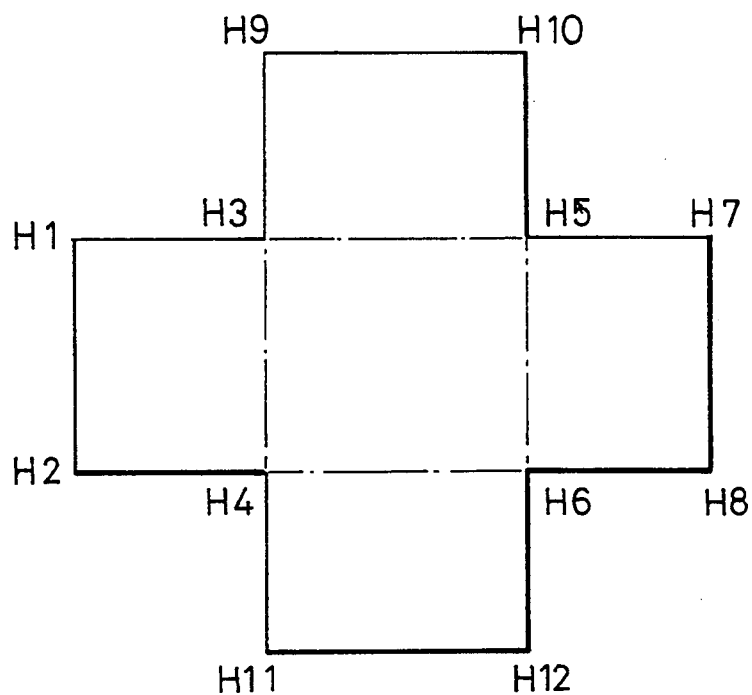
FIG. 11 is a view illustrating a sixth example of working by the sheet-metal processing apparatus of the present invention.
Figure 12:
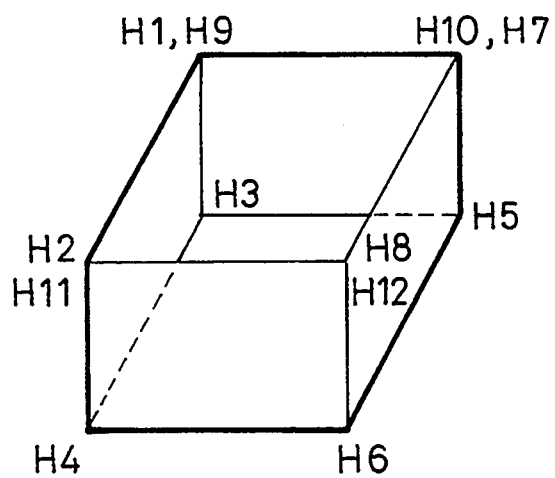
FIG. 12 is a view illustrating a seventh example of working by the sheet-metal processing apparatus of the present invention.

A description will now be given with respect to an actual example of the sheet-metal processing by the laser. First, a metal sheet having a shape as shown in FIG. 11 is cut from a sheet metal material through a cutting process of the metal sheet by means of the laser; a line segment H3H4 is then irradiated with a laser beam being scanned at a high speed; and, when its yield strength becomes low as the temperature of the portion irradiated with the laser is increased, a bending force is applied by the articulated robot 9 to the portion irradiated by the laser until a bending of 90° occurs. In a similar manner, it is bent to 90° also at the line segments H3H5, H5H6, H4H6 to obtain a configuration as shown in FIG. 12. The line segments H1H3 and H9H3 which coincide with each other in space are then irradiated with the laser beam to be welded. In a similar manner, the welding is performed along the line segments H2H4 and H11H4, H12H6 and H8H6, H7H5 and H10H5 to obtain a shape of a box which is the final shape as shown in FIG. 12. Further, the roughness of the weld is ground for finishing by a grinder which is grasped by the articulated robot 9. In addition, quenching by means of the laser for improving the strength of the box is performed at a suitable processing step in the above described processing steps. Thus, the various sheet-metal processing processes such as cutting, bending and welding of a metal sheet and finishing grinding and quenching of the weld thereof may be achived by a single sheet-metal processing apparatus.

As has been described, according to the method and apparatus for the sheet-metal processing of the present invention, bending and drawing of a metal sheet that conventionally requires many types of special dies may be replaced by a sheet-metal processing method which is based on a simple principle. The sheet-metal processing with a high degree of freedom may thus easily be achieved an such sheet-metal processing as cutting, welding, heat treatment and bending are possible by a single sheet-metal processing apparatus. It is therefore possible to accomplish total cost reduction and downsizing of a sheet-metal processing apparatus and a cost reduction in sheet-metal processing expenses.

A detail description will now be given with respect to various sheet-metal processing methods which are performed by using the sheet-metal processing apparatus as described above.

Figure 13:
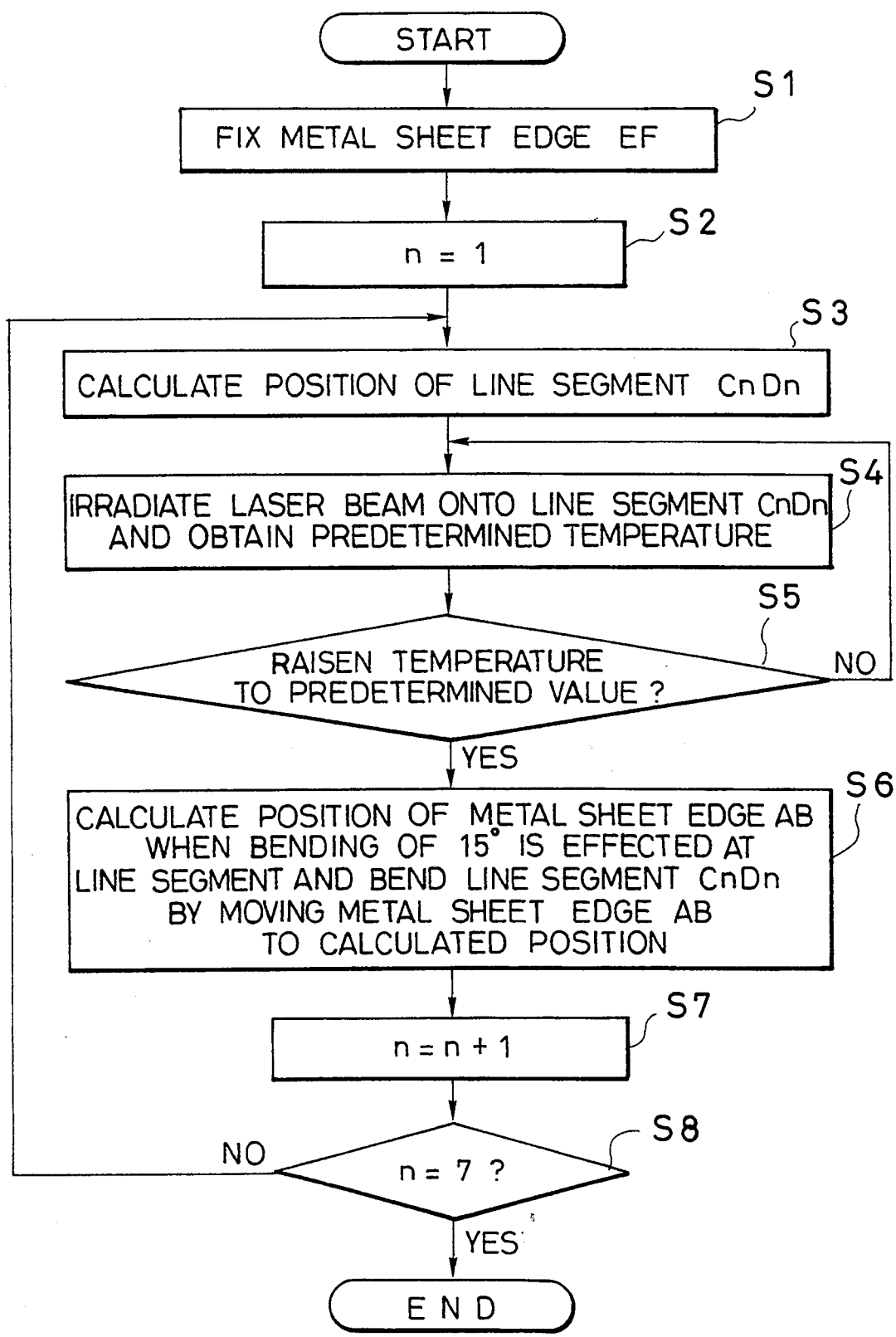
FIG. 13 is a flow chart showing a first example of bending procedure according to the sheet-metal processing method of the present invention.
Figure 14:
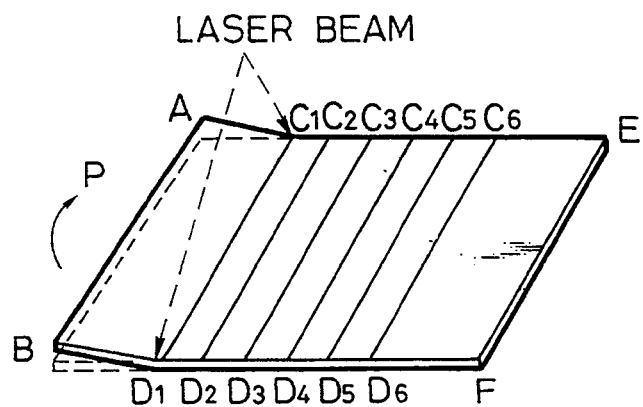
FIG. 14 is a view showing a first example of bending procedure according to the sheet-metal processing method of the present invention.
Figure 15:
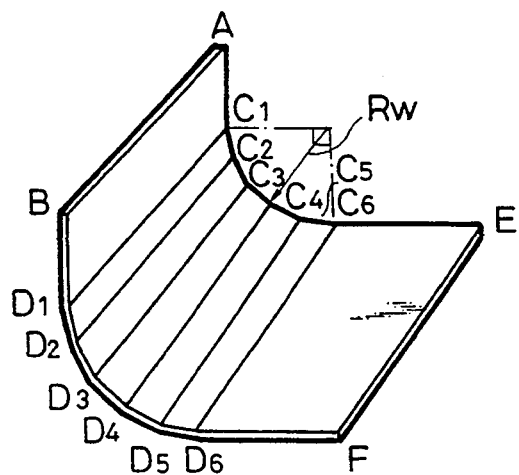
FIG. 15 is a view showing a second example of bending procedure according to the sheet-metal processing method of the present invention.

First, a sheet-metal processing method by bending of a sheet metal using a laser according to the present invention is described by way of a flow chart shown in FIG. 13. Suppose, as the working conditions, that a metal sheet ABFE as shown in FIG. 14 is to be worked into the shape of a circular arc of 90° having radius $R\omega$ as shown in FIG. 15 through six bending processes using the sheet-metal processing apparatus as shown in FIG. 8. First, a metal sheet edge EF of the work piece metal sheet ABEF is grasped and fixed by the work fixing device 11 (Step S1). A first process is then started as processing step number n=1 (Step S2). To effect the bending at a line segment CnDn, the position of the line segment CnDn is obtained by calculation based on information on the shape of the sheet metal material and information on the finished shape of the metal sheet (Step S3). The table 1 is moved to the position where the line segment CnDn may be irradiated with a laser beam L2; the line segment CnDn is irradiated with the laser beam L2 being scanned by means of the photo-conversion means 4; and, while the temperature at the line segment CnDn is measured by the temperature detector 8, the power of the laser beam L1 is controlled by the laser oscillator 3 so as to obtain a predetermined temperature at the line segment CnDn (Step S4). The controlling unit 5 then judges whether the temperature at the line segment CnDn has risen to the predetermined temperature (Step S5), and, if the predetermined temperature has not been obtained, the system returns to the Step S4 and the irradiation is continued until the predetermined temperature is obtained.

Figure 16:
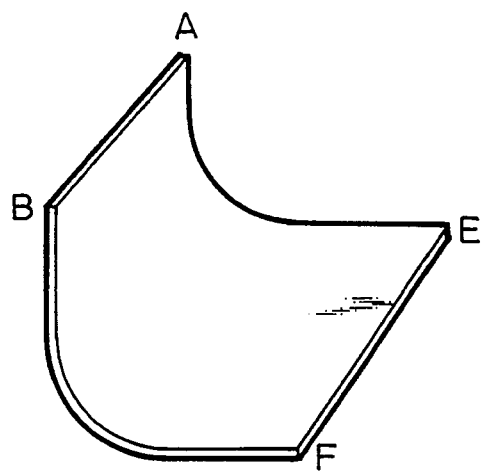
FIG. 16 is a view showing a third example of bending procedure according to the sheet-metal processing method of the present invention.
Figure 17:
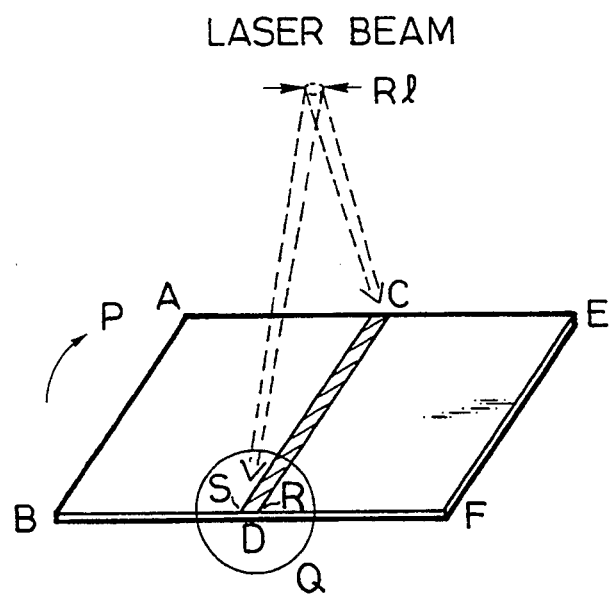
FIG. 17 is a view showing a fourth example of bending procedure according to the sheet-metal processing method of the present invention.
Figure 18:
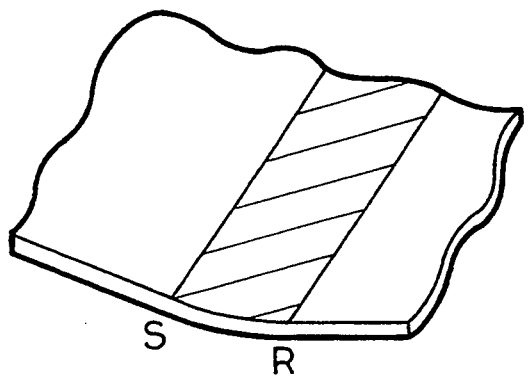
FIG. 18 is an enlarged view of the portion surrounded by the circle Q as shown in FIG. 17.

If the predetermined temperature has been achieved at the Step S5, a metal sheet edge AB is grasped by the work fixing device 10 capable of being controlled in position of the articulated robot 9; a path from the current position of the metal sheet edge AB to the position of the metal sheet edge AB when a bending of 15° is effected at the line segment CnDn is obtained by calculation; and the metal sheet edge AB is moved in the direction of arrow P in accordance with thus obtained path to cause a bend of 15° along the line segment CnDn (Step S6). Next, the processing step number "n" is increased by "1" (Step S7) and it is judged whether all the processes have been completed (n=7) (Step S8), and, if they have not been completed, the next "n"th processing step (Steps S3 to S7) is performed in a similar manner. When the sixth processing step of the line segment $C_6D_6$ is completed, "n=7" is attained at the Step S7 whereby the sheet-metal processing is terminated and a curved surface working of the shape as shown in FIG. 15 is completed. It should be noted that FIG. 16 shows an example of a case of repeating bending processes as described by making even smaller the intervals between the line segments, where the working is possible of a curved surface that is substantially continuous and smooth, Further, the diameter of laser beam irradiation to be applied to the line segment CD of the metal sheet ABFE may be adjusted to a suitable diameter R1 as shown in FIG. 17 and bending may be performed by irradiating the portion to be heated on the line segment CD with a laser beam being scanned with a width as indicated by the cross-hatched portion. Thereby, as shown in FIG. 18 which is an enlarged view of the portion surrounded by a circle Q shown in FIG. 17, the working is possible of which the shape of the bent portion RS substantially exhibits a circular arc.

Figure 19:
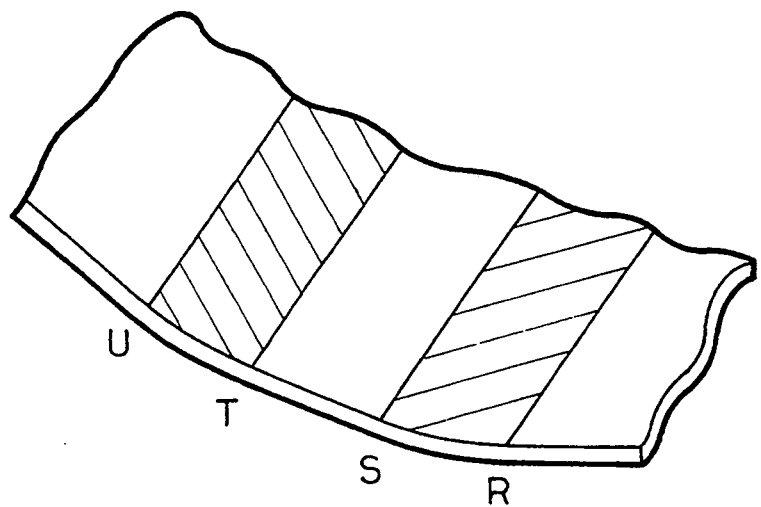
FIG. 19 is a view showing a fifth example of bending procedure according to the sheet-metal processing method of the present invention.
Figure 20:
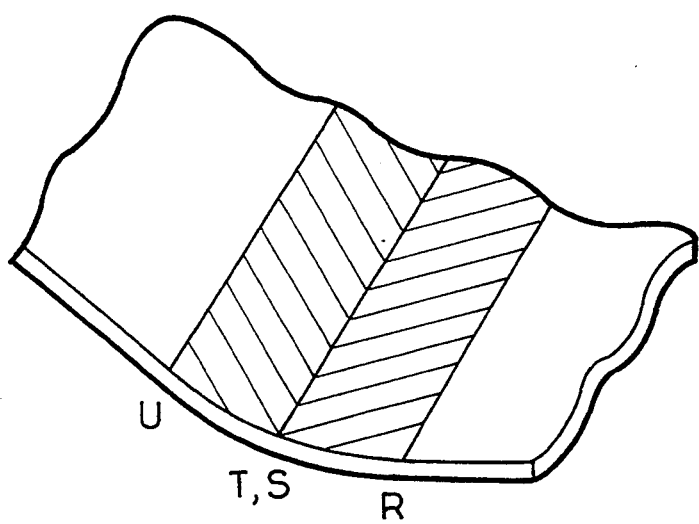
FIG. 20 is a view showing a sixth example of bending procedure according to the sheet-metal processing method of the present invention.

Furthermore, by repeating the above described working method to line segments the distance from which to the line segment CD is wider than the laser beam irradiation diameter, the working of a shape is possible where circular arcs and straight lines alternate with each other such as circular arc portion RS, straight line portion ST and circular arc portion TU as shown in FIG. 19. Moreover, by repeating it with intervals equal to or smaller than the laser beam irradiation diameter, the working of a shape is possible where a circular arc continually succeeds another as shown in FIG. 20. Since, when the curved surface working as described is performed, the precision of the worked shape and the smoothness of the worked surface conflict with processing time, it is necessary in practice that the width of the laser beam and the interval at which the deforming processing is performed must be selected in accordance with the required precision and smoothness.

Figure 21:
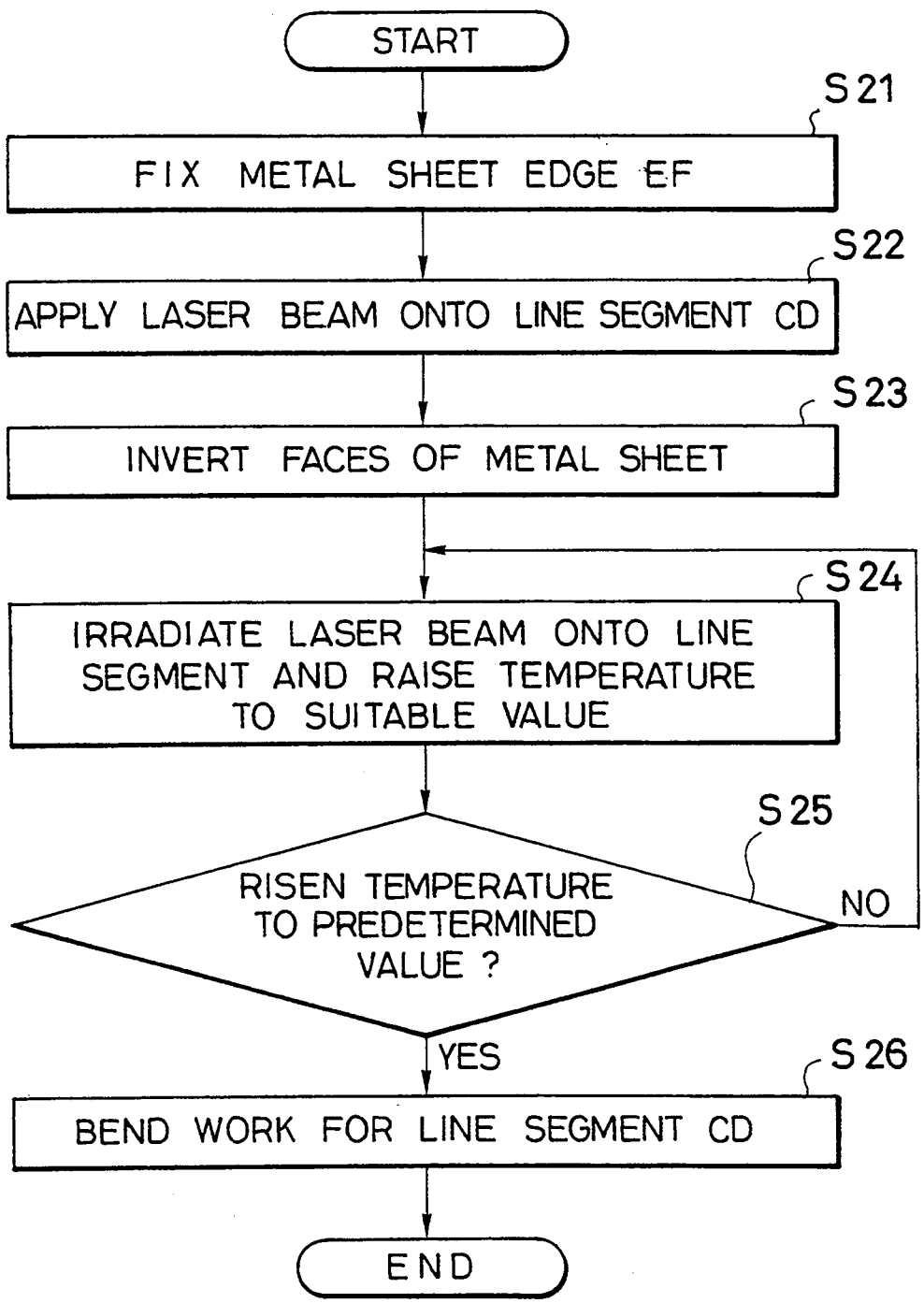
FIG. 21 is a flow chart showing a second example of bending procedure according to the sheet-metal processing method of the present invention.
Figure 22:
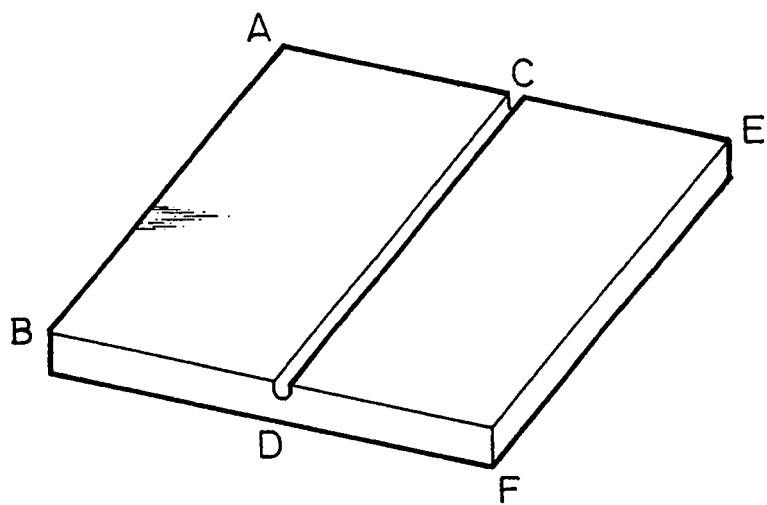
FIG. 22 is a view showing an example of preprocess working of bending as shown in FIG. 23.
Figure 23:
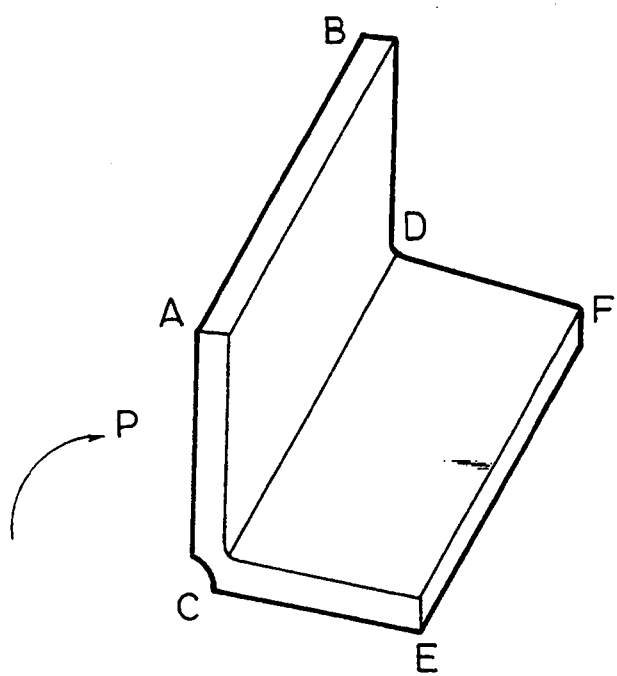
FIG. 23 is a view showing a seventh example of bending procedure according to the sheet-metal processing method of the present invention.

Next, an example of another method of the bending working is described with reference to a flow chart as shown in FIG. 21. Suppose now as working conditions that a metal sheet ABFE as shown in FIG. 22 is to be worked into the shape as shown in FIG. 23 by using the sheet-metal processing apparatus shown in FIG. 8. First, the metal sheet edge EF of the work piece metal sheet shown in FIG. 22 is grasped and fixed by the work fixing device 11 (Step S21). Next, the table 1 is moved to a position where the line segment CD may be irradiated with the laser beam L2; the laser beam L2 is applied thereon at such power (for example ⅓ the power for cutting by the laser beam) and at such speed of the laser beam L2 that a desired groove is formed along the line segment CD, whereby grooving as shown in FIG. 22 is performed as a pretreatment process (Step S22).

Next, the face and the reverse of the work piece metal sheet are inverted by the operator or by the articulated robot 9 and the metal sheet edge FE is again grasped and fixed by the work fixing device 11 (Step S23). The line segment Cd is irradiated with the laser beam L2 and the temperature thereof is raised to a suitable temperature for the bending (Steps S24 and S25). Upon attaining of a predetermined temperature thereat, the metal sheet edge AB is grasped by the work fixing device 10 capable of being controlled in the position by the articulated robot 9, and the path from the current position of the metal sheet edge AB to the position of the metal sheet edge AB when a bend of 90° is caused at the line segment CD is obtained by calculation. By causing the metal sheet edge AB to move in the direction of the arrow in accordance with such path, it is bent by 90° around the line segment CD (Step S26) to accomplish the bending of a shape as shown in FIG. 23.

It should be noted that the grooving for facilitating the bending may be applied on both of the face and reverse sides or on either one of the two sides of the metal sheet, such selection being made based on its use and the aimed precision in finishing of the angular portion.

Figure 24:
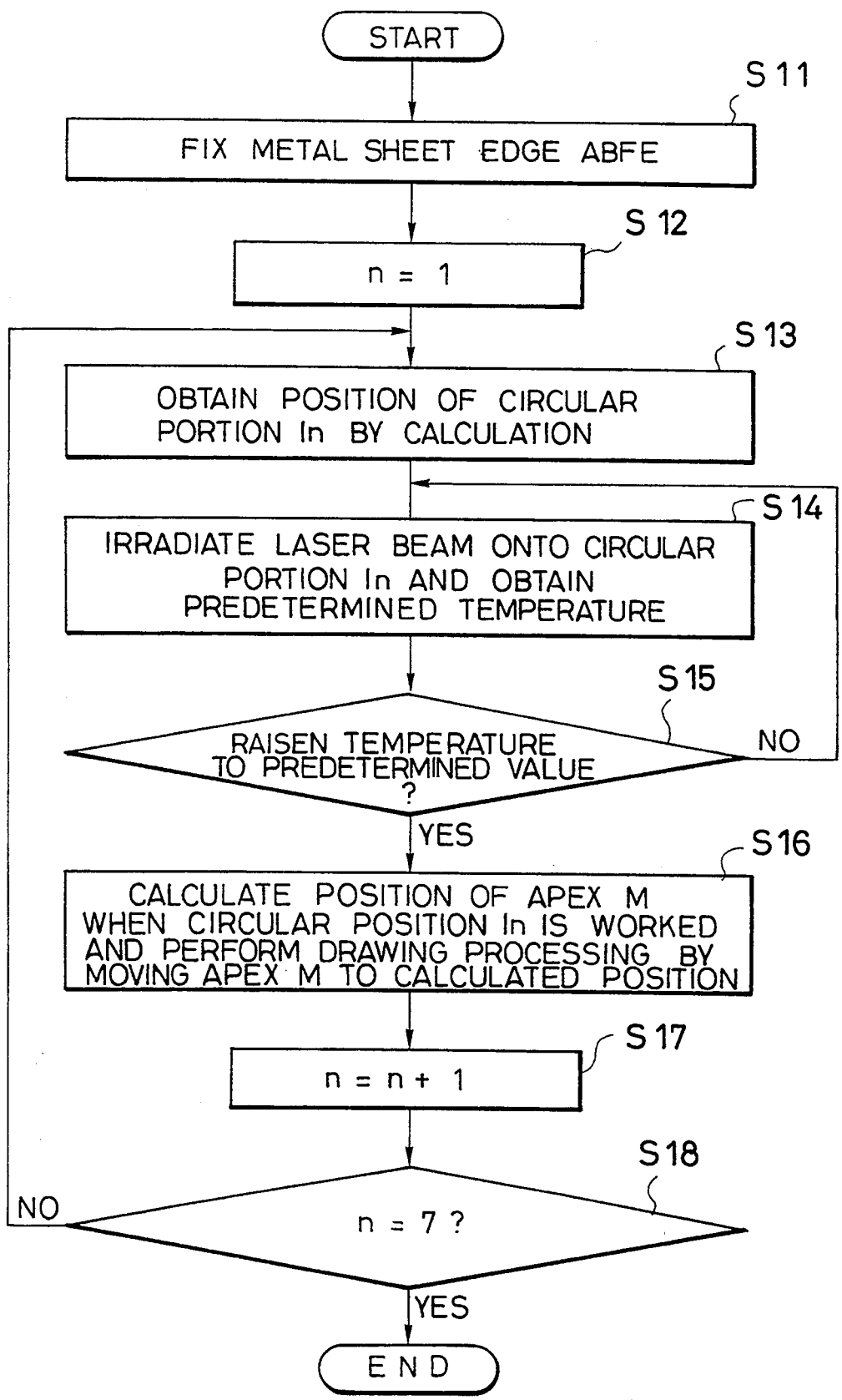
FIG. 24 is a flow chart showing an example of drawing work procedure according to the sheet-metal processing method of the present invention.
Figure 25A:
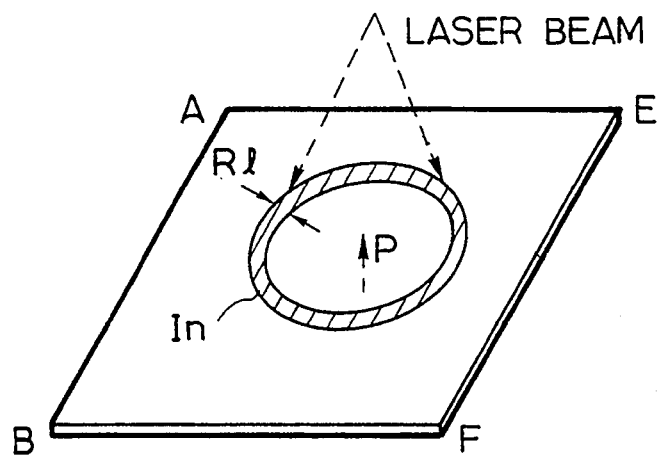
FIGS. 25A to 25C are views showing a first example of drawing work procedure according to the sheet-metal processing method of the present invention.
Figure 26:
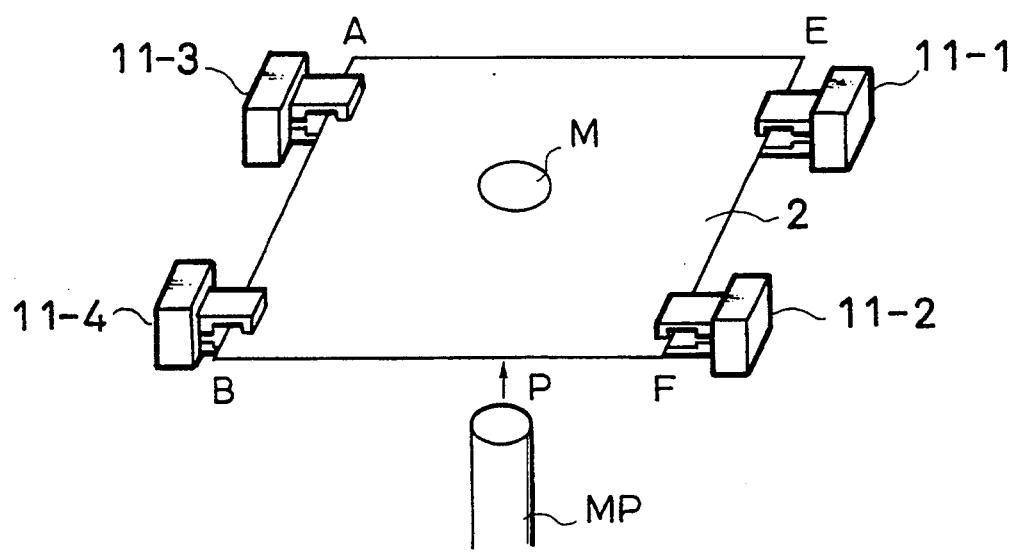
FIG. 26 is a perspective view showing another example of the work fixing portion of the sheet-metal processing apparatus of FIG. 8.

Next, sheet-metal processing method based on drawing of metal sheet using a laser according to the present invention is described by way of a flow chart as shown in FIG. 24. Suppose as the working conditions that the sheet-metal processing apparatus shown in FIG. 8 is used to work a metal sheet ABFE as shown in FIG. 25A into a shape as shown in FIG. 6 by six drawing processes with the laser beam L2 of an irradiation diameter R1. Here, work fixing portions in the sheet-metal processing apparatus of FIG. 8 are somewhat different from the previous ones and work fixing devices 11-1, 11-2, 11-3, 11-4 as shown in FIG. 26 that are fixed on the table 1 are used to fix a metal sheet edge ABFE of the work piece metal sheet shown in FIG. 25A (Step S11). Next, by putting the processing step number n=1, a first process is started (Step S12).

The position of circular portion $I_n$ shown in FIG. 6 is obtained by calculation on the basis of information on the sheet metal material and of the finished shape the metal sheet (Step S13). The table 1 is moved to a position where the circular portion $I_n$ may be irradiated with the laser beam L2; the irradiation diameter of the laser beam L2 is made to "R1" by means of the photo-conversion means 4 and it is applied to the circular portion $I_n$ in the manner as shown in FIG. 25A while it is being scanned; and the power of the laser beam L1 is controlled by the laser oscillator 3, while measuring the temperature of the circular portion $I_n$ by the temperature detector 8, so as to attain a predetermined temperature at the circular portion $I_n$ (Step S14). It is then judged by the controlling unit 5 whether the temperature at the circular portion $I_n$ is raised to the predetermined temperature (Step S15), and, if the predetermined temperature has not been attained, the system returns to the Step S14 where the irradiation is continued until the predetermined temperature is obtained.

Figure 25B:
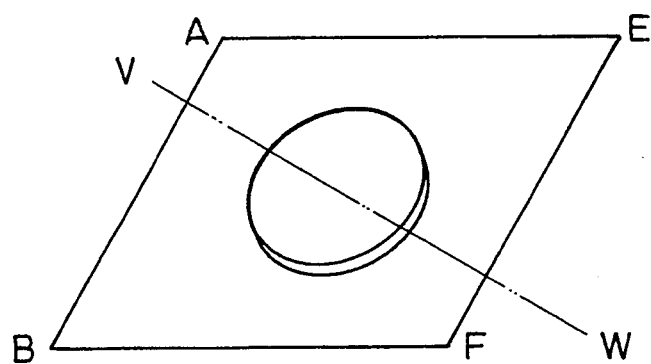
Figure 25C:

When, at the Step S15, the predetermined temperature has been attained, a drawing jig MP as shown in FIG. 26 is grasped by the articulated robot 9 and the path from the current position of the apex M to the apex M to be displaced by the first working process is obtained by calculation. By pressing the drawing jig MP to move it in accordance with such path, an upward (in the direction of arrow P) force is applied to the apex M to perform the drawing processing of the circular portion $I_n$ (Step S16). When the first working process is completed, the circular portion $I_n$ exhibits a convex as shown in FIG. 25B and the cross section taken along the chain double-dashed line V-W becomes as shown in FIG. 25C.

Next, the processing step number n is increased by "1" (Step S17); it is judged whether all the process have been ended (n=7) (Step S18); and, if not ended, the next "n"th working process (Steps S13 to S17) is performed in a similar manner. When the sixth working process of the circular portion $I_6$ is ended, N=7 is attained at the Step S18 to end all the workings, whereby drawing of a continuous convex as shown in FIG. 6 is completed.

FIG. 7 shows an example where the above described drawing processes are performed finely at intervals close to or smaller than the width of the laser beam L2, i.e., to the extent such that the laser beam L2 irradiated portion of a preceding process and the laser beam L2 irradiated portion of the next process are overlapped by each other. In this case, processing is possible of a convex that is substantially continuous and smooth. While drawing to obtain the shape of a hemisphere has been described by way of FIGS. 6 and 7, such other shapes as of a box or of a pyramid may be drawn in a similar manner. Further, the line to be irradiated with a scanning laser beam is not limited to a closed line in its continuity of the working shape, and the working is also possible of a shape of which a part of the shape to be drawn is missing.

Figure 27:
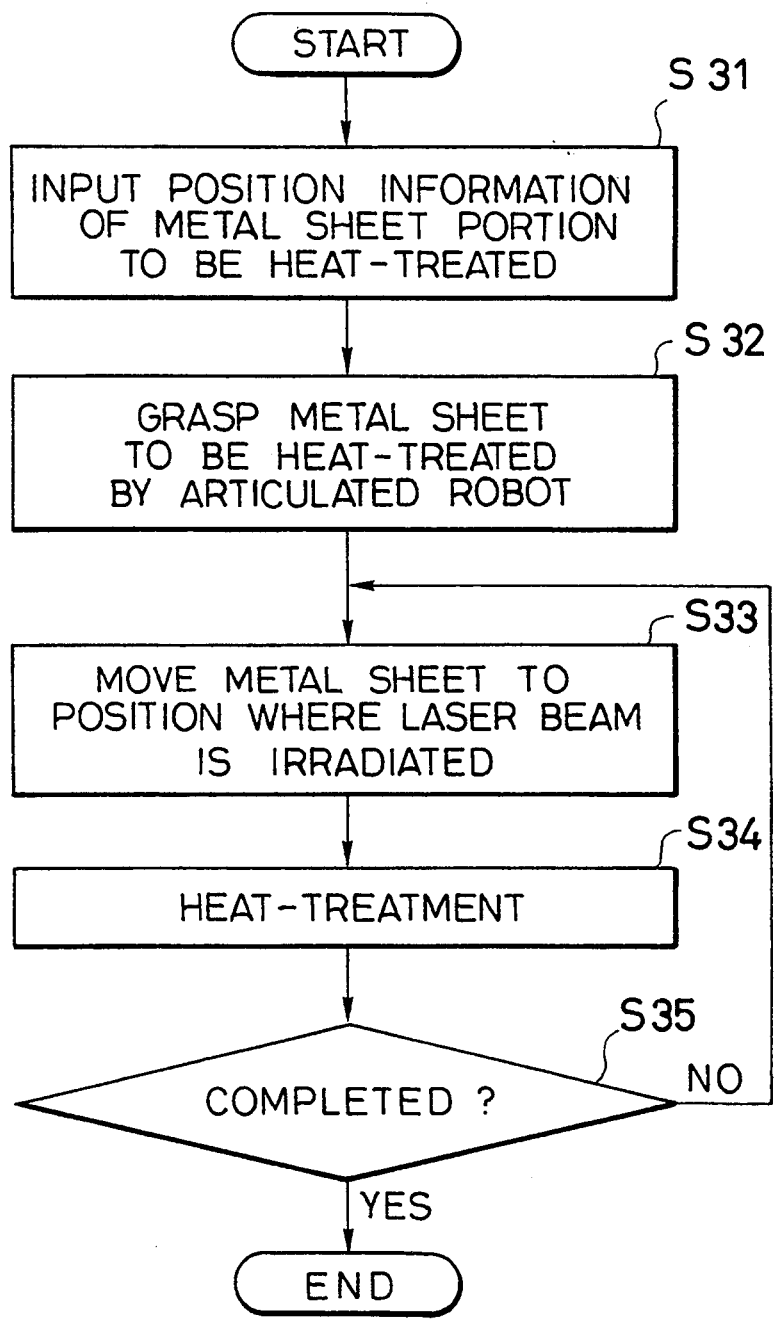
FIG. 27 is a flow chart showing an example of heat treatment procedure according to the sheet-metal processing method of the present invention.

Next, an example of the method of heat-treatment in a sheet-metal processing using a laser beam according to the present invention is described with reference to a flow chart as shown in FIG. 27.

First, the operator uses the sheet-metal processing apparatus as shown in FIG. 8 to input to the controlling unit 5 information on the portion of the metal sheet to be improved in rigidity (position information of the metal sheet portion to be heat-treated) (Step S31). Next, the metal sheet to be heat-treated is grasped by the work fixing device 10 of the articulated robot 9 (Step S32); and the table 1 is moved in accordance with the position information input at the Step S31 to the position where the portion to be improved in rigidity by means of heat-treatment may be irradiated with the laser beam L2 and the laser beam L2 is irradiated thereon while it is scanned to effect the heat-treatment (Steps S33 and S34). It is then judged by the controlling unit 5 whether all the processes of the heat-treatment have been completed (Step S35), and, if not, the Step S33 and the Step S34 are performed in a similar manner for the remaining processes to complete the heat-treatment process.

From the view point of the strength of a sheet metal part in the case of working a box-like shape, it is very effective to heat-treat the vicinity of the angled portions of the sheet metal part to improve rigidity. As the rigidity of the metal sheet is improved, it is possible to use a sheet metal material which is a rank lower in thickness, whereby reduction in costs and reduction in size of the worked part may be achieved.

It should be noted that, as an actual method of the heat-treatment by the laser, there are methods such that the portions to be heat-treated of the metal sheet are heated in sequence at a speed by which the temperature of the irradiated portion becomes 800° C. with a predetermined laser beam diameter, or that scanning laser beam is used to effect similar heating. Further, it is a fundamental requirement of the heat-treatment that it is necessary to perform the heating at such time so as not to melt the metal and that it is necessary to perform quenching in cooling based on the thermal conduction of the surrounding metal which is not to be heat-treated or using a forced cooling liquid, for example.

Further, in order to accurately obtain desired shapes in curved surface working and drawing of a metal sheet, it is necessary that the temperature distribution of the portion to be deformed exhibit an expected temperature distribution. When a process is to be performed, the deforming portions to be worked may not exhibit an expected temperature distribution because of the heat remaining of the previous process. As measures to this, among the methods which may be effective to avoid thermal interference between the processes in deforming working which is continuously performed are: a method in which a relatively remote portion is selected from the plurality of points to be deformed; or a method in which, for example, an assist gas for laser cutting or air for cooling is used and the next process is started after cooling the heat of the previous process to a degree where it does not cause a thermal interference.

Figure 28A:
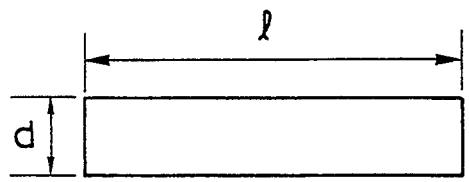
FIGS. 28A to 28D are views showing an example of scanning irradiation method of a laser beam according to the sheet-metal processing method of the present invention.
Figure 28B:
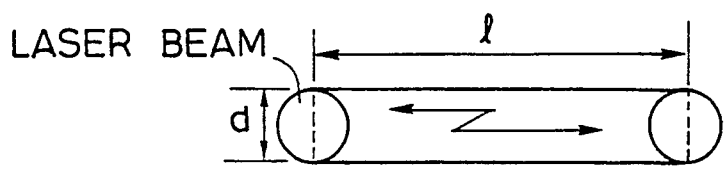
Figure 28C:
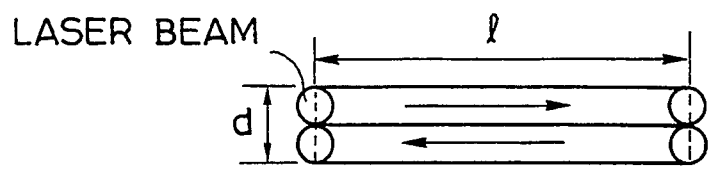
Figure 28D:
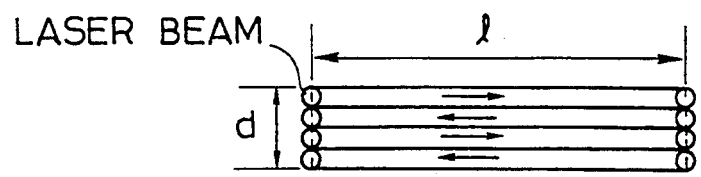

Next, a description is given by way of an example shown in FIGS. 28A to 28D with respect to a scanning irradiation method of the laser beam to be used in the sheet-metal processing methods as described above. Now, when the sheet metal portion of the shape having a width d and a length l as shown in FIG. 28A is to be heated, among the methods thereof to be considered are: a method as shown in FIG. 28B in which the diameter of the laser beam is adjusted to "d" and the laser beam is scanned simply in a right and left direction; a method as shown in FIG. 28C in which the diameter of the laser beam is adjusted to "d/2" and the laser beam is scanned to be irradiated in the shape of the width d and the length l through a round trip; and a method as shown in FIG. 28D in which the diameter of the laser beam is adjusted to "d/4" and the laser beam is scanned to be irradiated in the shape of the width d and the length l by two round trips. Further, such methods are considered in which: in order to obtain a uniform temperature distribution, the thermal conductivity of the surroundings is taken into account and the irradiation is effected by increasing the rate of the scanning for the portion surrounding the region to be heated; or, the strength of the laser beam (laser power) is varied for irradiation while it is scanned.

Figure 29:
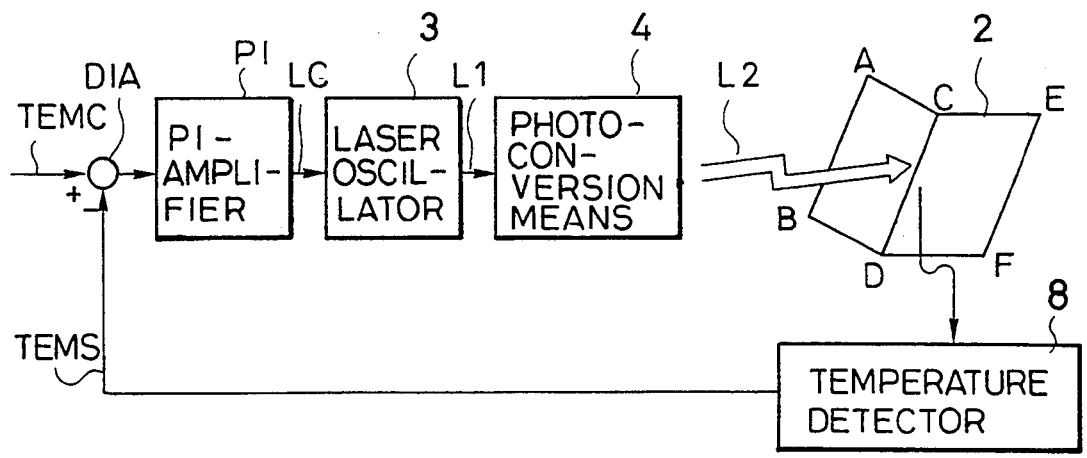
FIG. 29 is a block diagram showing a first example of a laser power control in the sheet-metal processing method of the present invention.

FIG. 29 is a block diagram showing a first example of laser power controlling, based on which a description is given with respect to a controlling method of laser power by temperature detection of the laser irradiated portion. A subtracter DIA calculates the difference between a preset temperature TEMC of the worked portion previously set by the operator and the measured temperature TEMS of the laser irradiated portion of the work piece metal sheet 2 measured at the temperature detector 8, and it delivers to the laser oscillator 3 a laser power command LC which has been amplified at a proportional-integrating (PI) amplifier PI. The laser oscillator 3 adjusts the intensity of the laser beam L1 on the basis of the laser power command LC and irradiates the portion CB to be deformed of the metal sheet 2 with the laser beam L2 being scanned by way of the photo-conversion means 4. The temperature TEMS of the irradiated portion of the metal sheet 2 is continuously measured by the temperature detector 8 and the laser power is controlled based on the method as described above so that it is kept at the previously set temperature TEMC.

Figure 30:
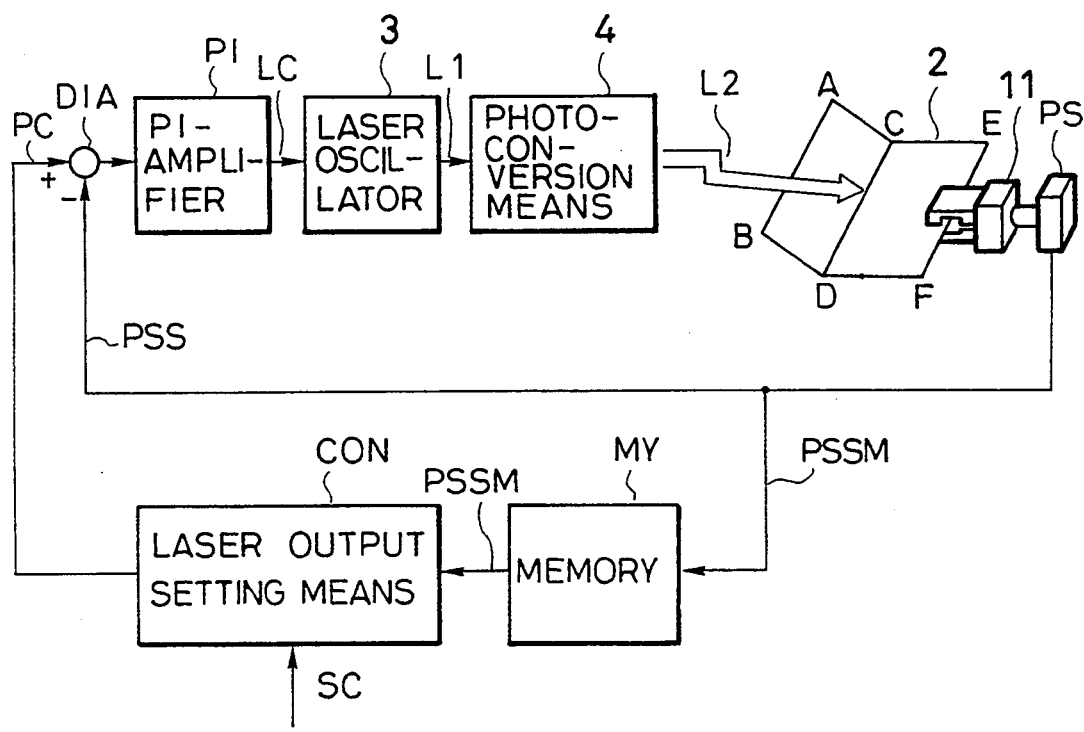
FIG. 30 is a block diagram showing a second example of a laser power control in the sheet-metal processing method of the present invention.

FIG. 30 is a block diagram showing a second example of the laser power controlling, based on which a description is given with respect to the controlling method of the laser power by the measurement of the reaction force of bending of the metal sheet. An initial bending reaction force PSSM of the work piece metal sheet 2 before irradiating the laser beam is measured by a reaction force detector PS which is connected to the work fixing device 11 and it is stored in a memory MY. While a laser output setting means CON is capable of changing the operation based on the processing conditions SC which is set by the operator, during a deforming working operation of the metal sheet, it reads the initial bending reaction force PSSM from the memory MY and delivers to the subtracter DIA "⅓" the initial bending reaction force PSSM, for example, as a bending reaction force set value PC. The subtracter DIA calculates the difference between the bending reaction force set value PC and the bending reaction force PSS of the work piece metal sheet 2 which has been measured by the reaction force detector PS and delivers to the laser oscillator 3 a laser power command LC which has been amplified by the proportional-integrating (PI) amplifier PI.

The laser oscillator 3 adjusts the intensity of the laser beam L1 on the basis of the laser power command LC, and it irradiates the portion CD to be deformed of the metal sheet 2 by way of the photo-conversion means 4 with the laser beam L2 that is being scanned. The bending reaction force PSS of the metal sheet 2 is continually measured by the reaction force detector PS, and, in this example, the laser power is controlled by the method as described above so that the bending reaction force of the work piece metal sheets is at "⅓" of the initial reaction force before heating. There is also another method in which the reaction force estimated for the time of heating is previously obtained by calculation based on the shape information and material information of the metal sheets and the laser power is controlled by comparing such value and an actually measured reaction force.

Figure 31:
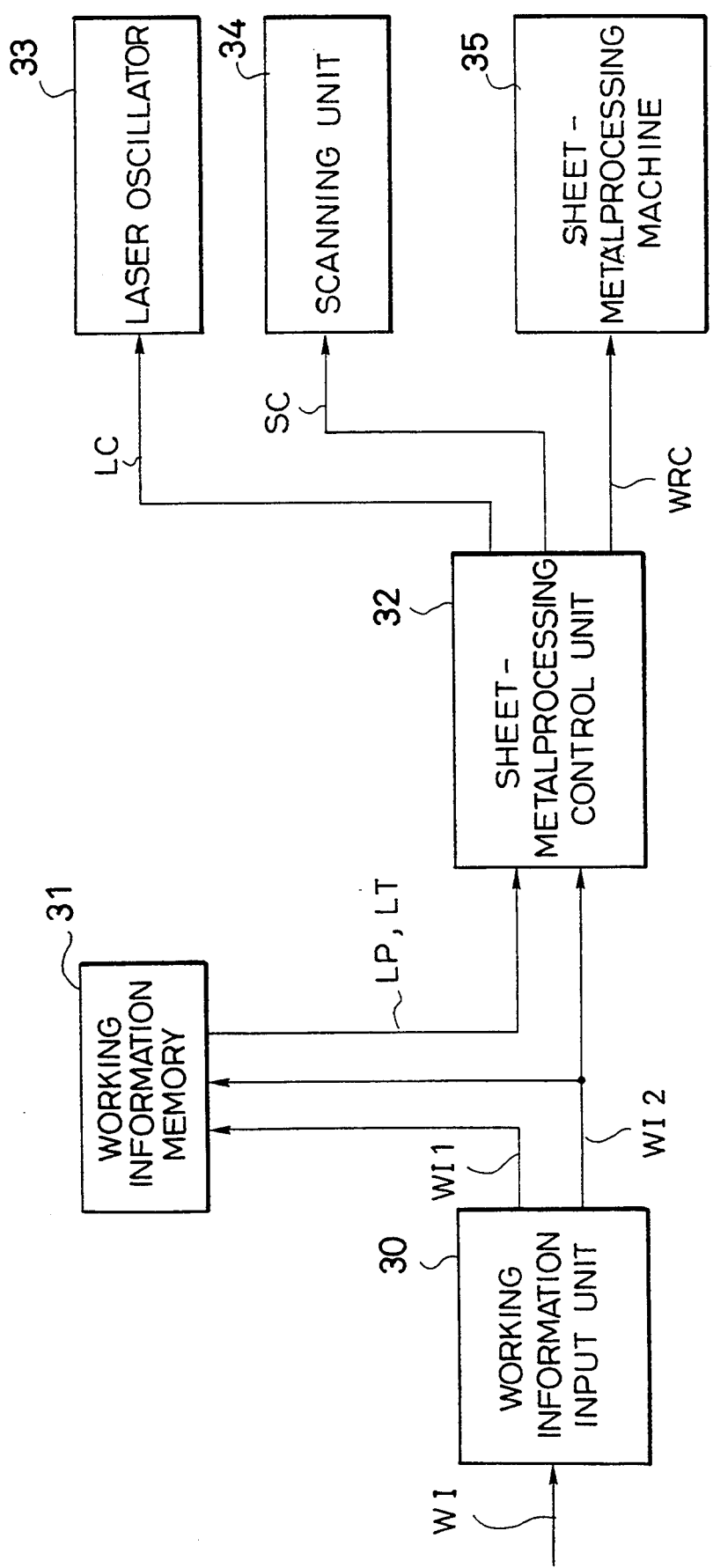
FIG. 31 is a block diagram showing an example of sheet-metal processing system based on a deforming working program of the present invention.

Next, a description will be given with respect to a sheet-metal processing system based on a deforming working program of sheet-metal processing using a laser according to the present invention. To perform the deforming working of a metal sheet using a laser, many informations are necessary such as on the material and thickness of the sheet metal, the length and shape of portion to be deformed, and the intensity and irradiation time of the laser beam. It is effective from the view point of working efficiency to previously store the relations among these factors to a control unit for laser working or a forming device for a deforming working program and a deforming working program is formed automatically within the unit or by way of an operator using such information whereby the sheet-metal processing is performed based on the deforming working program. FIG. 31 is a block diagram showing an example of a sheet-metal processing system based on a deforming working program according to the present invention, which illustrates a case of bending working.

Of working information WI such as of material and thickness of the metal sheet and working shape that have been inputted by the operator, the material and thickness WI1 is stored into a working information memory 31 via a working information input unit 30, and the working shape WI2 is stored into the sheet-metal processing control unit 32. The relations between the material and the thickness of the metal sheet, the length of the portion to be deformed and the intensity and irradiation time of the laser beam are previously stored to the working information memory 31 which is constituted, for example, by a semiconductor memory, and the intensity LP of the laser beam to be applied while it is scanned to the work piece metal sheet, the irradiation time LT of the laser beam and the working shape WI2 are read out by the sheet-metal processing control unit 32, and, based on these data, the laser output command LC to the laser oscillator 33, scanning command SC to the scanning unit 34 and working command WRC to the sheet-metal processing machine 35 including the bending mechanism are formed, The sheet-metal processing is performed in accordance with each of the these commands.

In a system constructed in this manner, the operator may achieve working of a metal sheet simply by inputting the material and the thickness of the metal sheet and the working shape while he is not aware of the intensity and irradiation time of the laser beam. It should be noted that, while, in the example of FIG. 31, a description has been given only with respect to a case of bending, sheet-metal processing based on a deforming working program may be easily implemented also for cutting, the welding and the heat-treatment by previously storing working know-how in a similar manner to the working information memory 31.

While the deforming working of the sheet metal using the laser as described above itself is a very effective working method, establishing of this technique makes possible the implementation of a series of workings of the metal sheet on a single sheet-metal processing apparatus by combining sheet-metal processing methods based on welding, heat-treatment, grinding of the metal sheet which use the laser. Suppose now that the sheet-metal processing apparatus as shown in FIG. 8 is used to work the metal sheet into a box-like shape as shown in FIG. 12. First, a metal sheet having a shape as shown in FIG. 11 is cut from a sheet metal material by means of cutting working of the sheet metal using the laser. A line segment H3H4 is then irradiated with a laser beam while it is scanned at a high speed, and, when the yield strength of the laser irradiated portion becomes low as the temperature thereof rises, a bending force is applied to the laser irradiated portion by the articulated robot 9 until a bending of 90° is achieved. In a similar manner, bending of 90° is performed also with respect to the line segments H3H5, H5H6, H4H6 to obtain a shape as shown in FIG. 12.

The overlapped line segments H1H3 and H9H3 are irradiated with the laser beam to be welded. In a similar manner, the welding is performed also with respect to the line segments H2H4 and H11H4, H12H6 and H8H6, H7H5 and H10H5 to complete a box-like shape which is the final shape as shown in FIG. 12. Further, the roughness of the weld is ground for finishing by a grinder which is grasped by the articulated robot 9. Quenching by means of the laser for improving the strength of the box is performed at a suitable processing step in the above described processing steps. Thereby, various sheet-metal processing such as cutting, bending and welding of a metal sheet, finishing grinding of the weld thereof and quenching may be achieved by a single sheet-metal processing apparatus.

Figure 32:
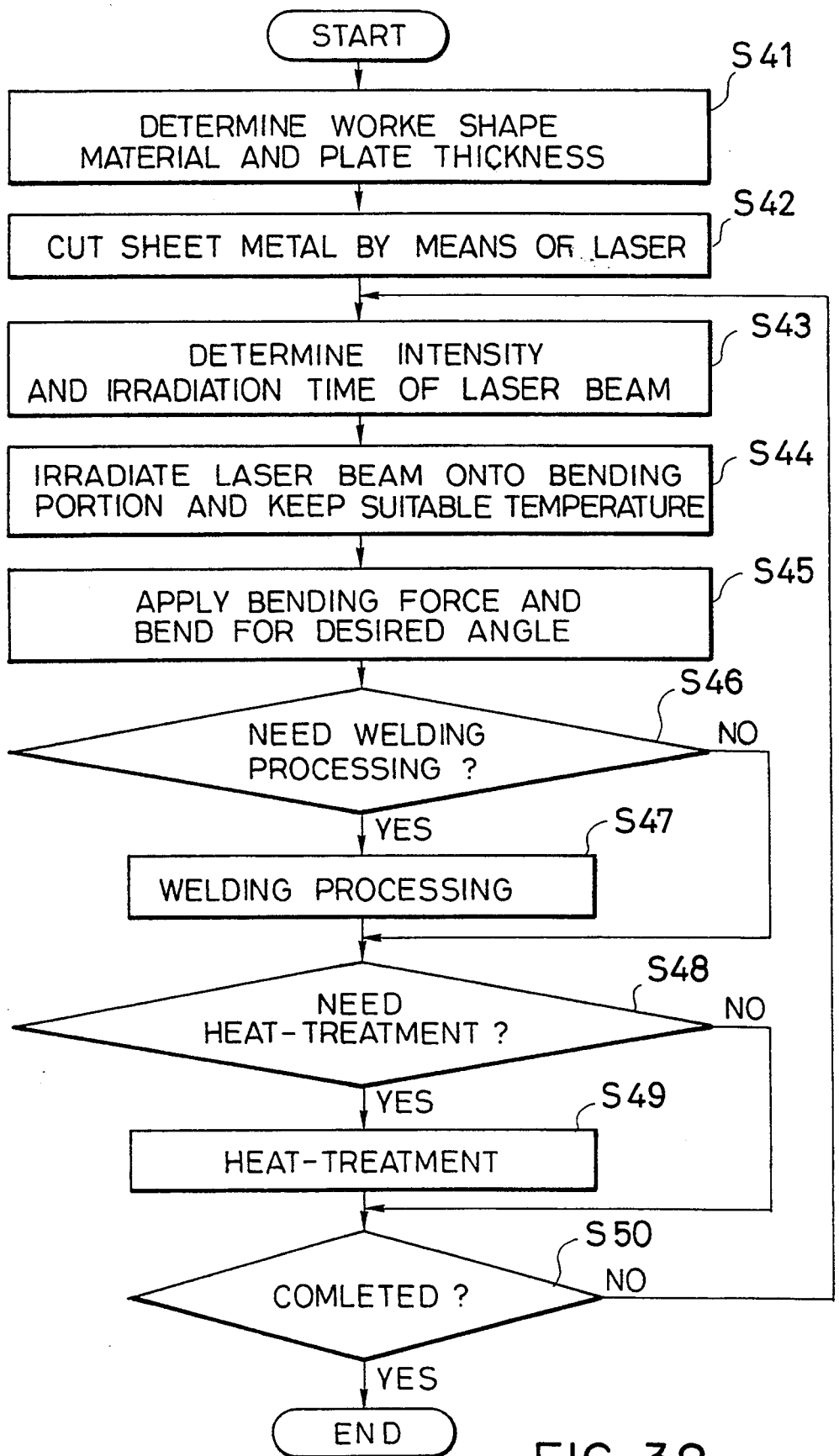
FIG. 32 is a flow chart showing an example of working procedure in working using various sheet-metal processing methods of the present invention.

Next, an example of working procedure for the case of performing the cutting, the bending, the welding and the heat-treatment by means of a single sheet-metal processing apparatus is described by way of a flow chart as shown in FIG. 32. First, a working program which is a generalized working procedure is formed on the basis of the worked shape, material and plate thickness of the metal sheet (Step S41). The sheet metal material is then cut by means of the laser to cut the shape before bending (Step S42). The laser irradiation conditions such as scanning contour of the laser beam, the intensity of the laser beam and irradiation time of the laser beam are determined with respect to a portion to be bent by the bending working which is the first in the bending sequence determined at the Step S41 among all the portions to be bent of the metal sheet (Step S43). The portion to be bent is irradiated with the laser beam being scanned to keep it at a suitable temperature for bending (Step S44), and a bending force is applied to the bending portion to perform the bending working of a desired angle (Step S45).

If welding is necessary in the vicinity of the bent portion, the welding processing is then performed in accordance with the working procedure determined at the Step S41 (Step S46 and S47), and, if heat-treatment is necessary, the heat-treatment is also performed (Steps S48 and S49). It is judged whether all the workings have been completed (Step S50), and, if an unprocessed portion remains, the system returns to the Step S43 while the processing is terminated if all the workings have been completed. It should be noted that the welding work and the heat-treatment may also be performed collectively after completing all the bending processes.

As has been described, according to the method of sheet-metal processing of the present invention, bending and drawing of a metal sheet that conventionally requires many types of special dies may be replaced by a sheet-metal processing method which is based on a simple principle. Sheet-metal processing with a high degree of freedom may thus easily be achieved and such sheet-metal processing as cutting, welding, heat-treatment and bending are possible by a single sheet-metal processing apparatus. It is therefore possible to accomplish a total cost reduction and downsizing of a sheet-metal processing apparatus and a cost reduction in sheet-metal processing expenses.

It should be understood that many modifications and adaptations of the invention will become apparent to those skilled in the art and it is intended to encompass such obvious modifications, and changes in the scope of the claims appended hereto.

What is claimed is:

1. A method of sheet-metal processing comprising the steps of:

irradiating a portion to be deformed of a metal sheet with a laser beam being scanned at a high speed to heat said portion to be deformed;

measuring a bending reaction force of the metal sheet while irradiating said portion to be deformed with said laser beam;

comparing a preset value denoting an initial bending reaction force of said metal sheet and the measured bending reaction force of said metal sheet to obtain a comparison result, said preset value obtained either by measuring said initial bending reaction force of said metal sheet before said irradiating of said laser beam or by estimating said initial bending reaction force of said metal sheet based on a configuration and a material of said metal sheet;

controlling an intensity of said laser beam on the basis of said comparison result; and applying a predetermined force to said portion to be deformed so as to process said metal sheet upon detecting that said metal sheet is deformable upon application of said predetermined force based on said comparison result.

2. A method of sheet-metal processing comprising the steps of:

storing into a laser working control unit or into a unit for forming a deforming working program data denoting a relation between an intensity and irradiation time of a working laser beam and characteristics of a metal sheet to be deformed including a material of the metal sheet, a thickness of the metal sheet and a length and configuration of a portion thereof to be deformed;

forming a deforming working program based on the data stored in said storing step;

irradiating the portion to be deformed of the metal sheet with a laser beam being scanned at a high speed to heat said portion to be deformed based on said deforming working program; and applying a force to said portion to be deformed so as to process said metal sheet based on said deforming working program.

3. A laser working apparatus comprising:

a laser oscillator;

a laser beam conducting means for conducting a laser beam output from said laser oscillator to converge said laser beam;

a scanning means for scanning said laser beam at a high speed in a straight line or in an arbitrary contour;

a deforming device including a table for mounting a metal sheet and for being moved in X- and Y-axial directions, work fixing devices for grasping ends of said metal sheet and an articulated robot for moving said work fixing devices to apply a force to said metal sheet to deform said metal sheet which is irradiated with said laser beam scanned at a high speed; and a control means for controlling said laser oscillator, said laser beam conducting means, said scanning means and said deforming device in accordance with preset working conditions of said metal sheet.

4. A method of sheet-metal processing comprising:

performing a bending process including irradiating and scanning a laser beam at a high speed in a straight line on a metal sheet surface to heat a portion along said straight line, and applying a bending force to said straight line to bend said metal sheet when the portion along said straight line has attained a predetermined temperature; and repeating said performing step sequentially on plural straight lines which are substantially parallel to each other at predetermined intervals within portions to be deformed on said metal sheet to bend said metal sheet into a curved surface having a cross section that is substantially continuous and smooth; and effecting a heat-treatment process of said metal sheet including a process of sequentially irradiating a laser beam having a predetermined laser beam diameter at a predetermined scanning speed such that irradiated portions of said metal sheet attain a predetermined heat treatment temperature and such that a thermal interference between each sequential irradiating processes is prevented.

5. A method of sheet-metal processing comprising the steps of:

irradiating a surface line forming a closed path surrounding a portion to be deformed of a metal sheet with a laser beam being scanned at a high speed to heat said portion to be deformed;

measuring a bending reaction force of the metal sheet while irradiating said portion to be deformed with said laser beam;

comparing a preset value denoting an initial bending reaction force of said metal sheet and the measured bending reaction force of said metal sheet to obtain a comparison result, said preset value obtained either by measuring said initial bending reaction force of said metal sheet before said irradiating of said laser beam or by estimating said initial bending reaction force of said metal sheet based on a configuration and a material of said metal sheet;

controlling an intensity of said laser beam on the basis of said comparison result; and applying a predetermined force to said portion to be deformed so as to process said metal sheet upon detecting that said metal sheet is deformable upon application of said predetermined force based on said comparison result.

6. A method of sheet-metal processing comprising the steps of:

storing into a laser working control unit or into a unit for forming a deforming working program data denoting a relation between an intensity and irradiation time of a working laser beam and characteristics of a metal sheet to be deformed including a material of the metal sheet, a thickness of the metal sheet and a length and configuration of a portion thereof to be deformed;

forming a deforming working program based on the data stored in said storing step;

irradiating a surface line forming a closed path surrounding the portion to be deformed of the metal sheet with a laser beam being scanned at a high speed to heat said portion to be deformed based on said deforming working program; and applying a force to said portion to be deformed so as to process said metal sheet based on said deforming working program.

7. A method of sheet-metal processing comprising:

performing a bending process including irradiating and scanning a laser beam scanned at a high speed in a contoured line forming a closed path on a metal sheet surface to heat a portion surrounded by said contoured line, and applying a bending force to said straight line to bend said metal sheet when the portion along said contoured line has attained a predetermined temperature; and repeating said performing step sequentially on plural contoured lines which are substantially concentric to each other at predetermined intervals within portions to be deformed on said metal sheet to bend said metal sheet into a curved surface having a cross section that is substantially continuous and smooth; and effecting a heat-treatment process of said metal sheet including a process of sequentially irradiating a laser beam having a predetermined laser beam diameter at a predetermined scanning speed such that irradiated portions of said metal sheet attain a predetermined heat treatment temperature and such that a thermal interference between each sequential irradiating processes is prevented.

* * * * *